(12) United States Patent
Khoshnevis

(10) Patent No.: US 10,301,814 B2
(45) Date of Patent: May 28, 2019

(54) CONTOUR CRAFTING EXTRUSION NOZZLES

(71) Applicant: University of Southern California, Los Angeles, CA (US)

(72) Inventor: Behrokh Khoshnevis, Marina del Rey, CA (US)

(73) Assignee: UNIVERSITY OF SOUTHERN CALIFORNIA, Los Angeles, CA (US)

( * ) Notice: Subject to any disclaimer, the term of this patent is extended or adjusted under 35 U.S.C. 154(b) by 664 days.

(21) Appl. No.: 14/961,071

(22) Filed: Dec. 7, 2015

(65) Prior Publication Data
US 2016/0083956 A1 Mar. 24, 2016

Related U.S. Application Data

(63) Continuation of application No. 14/316,492, filed on Jun. 26, 2014, now Pat. No. 9,206,601, which is a (Continued)

(51) Int. Cl.
*B28B 3/20* (2006.01)
*B29C 64/188* (2017.01)
(Continued)

(52) U.S. Cl.
CPC .............. *E04B 1/3505* (2013.01); *B28B 3/20* (2013.01); *B28B 11/04* (2013.01); (Continued)

(58) Field of Classification Search
CPC ... B28B 3/20; B29C 47/0052; B29C 47/0066; B29C 47/026; B29C 47/065; (Continued)

(56) References Cited

U.S. PATENT DOCUMENTS

| 3,239,904 A | 3/1966 | Harshberger |
| 3,748,079 A | 7/1973 | Moreno et al. |

(Continued)

FOREIGN PATENT DOCUMENTS

| AT | 3239904 B | 4/1988 |
| WO | WO 00/078159 A1 | 12/2000 |
| WO | WO 09/055580 A1 | 4/2009 |

OTHER PUBLICATIONS

Khoshnevis, B. et al. 2002. Automated Construction Using Contour Crafting: Applications on Earth and Beyond. International Symposium on Automation and Robotics in Constructions, 19th (ISARC), Proceedings. National Institute of Standards and Technology, Gaithersburg, Maryland, Sep. 23-25, 2002, pp. 489-494.

(Continued)

*Primary Examiner* — Alison L Hindenlang
*Assistant Examiner* — Joseph S Leyson
(74) *Attorney, Agent, or Firm* — Snell & Wilmer LLP

(57) ABSTRACT

An automated extrusion construction system may include an extrusion nozzle configured to extrude construction material in a substantially horizontal direction against an elongated and substantially vertical surface. An extrusion nozzle may have a height adjustment mechanism configured to adjust the height of an outlet in response to level deviations in the surface on which the construction material is extruded by the extrusion nozzle. An automated extrusion construction system may include a slicing mechanism configured to controllably slice through the extruded layer.

20 Claims, 12 Drawing Sheets

Related U.S. Application Data continuation of application No. 12/739,137, filed on Apr. 21, 2010, now Pat. No. 8,801,415, which is a continuation-in-part of application No. 11/556,027, filed on Nov. 2, 2006, now Pat. No. 7,841,851, which is a continuation-in-part of application No. 11/552,885, filed on Oct. 25, 2006, now Pat. No. 7,874,825, which is a continuation-in-part of application No. 11/040,518, filed on Jan. 21, 2005, now Pat. No. 7,837,378, which is a continuation-in-part of application No. 11/040,602, filed on Jan. 21, 2005, now Pat. No. 7,452,196, which is a continuation-in-part of application No. 11/040,401, filed on Jan. 21, 2005, now Pat. No. 7,641,461, which is a continuation-in-part of application No. 11/552,741, filed as application No. PCT/US2008/080976 on Oct. 23, 2008, now Pat. No. 7,814,937, said application No. 12/739,137 is a continuation-in-part of application No. 11/934,507, filed on Nov. 2, 2007, now Pat. No. 8,029,710, which is a continuation-in-part of application No. 11/933,985, filed on Nov. 1, 2007, now Pat. No. 7,574,925, which is a continuation-in-part of application No. 11/780,978, filed on Jul. 20, 2007, now abandoned, which is a continuation-in-part of application No. 11/733,096, filed on Apr. 9, 2007, now Pat. No. 7,850,388, which is a continuation-in-part of application No. 11/556,048, filed on Nov. 2, 2006, now Pat. No. 7,841,849.

(60) Provisional application No. 60/982,378, filed on Oct. 24, 2007, provisional application No. 60/990,581, filed on Nov. 27, 2007.

(51) Int. Cl.
| | |
|---|---|
| *E04B 1/35* | (2006.01) |
| *B29C 64/106* | (2017.01) |
| *B28B 11/04* | (2006.01) |
| *B29C 47/00* | (2006.01) |
| *B29C 47/02* | (2006.01) |
| *B29C 47/06* | (2006.01) |
| *B29C 47/92* | (2006.01) |
| *E04B 2/84* | (2006.01) |
| *E04C 1/00* | (2006.01) |
| *B33Y 10/00* | (2015.01) |

(52) U.S. Cl.
CPC ...... *B29C 47/0023* (2013.01); *B29C 47/0052* (2013.01); *B29C 47/0066* (2013.01); *B29C 47/026* (2013.01); *B29C 47/065* (2013.01); *B29C 47/92* (2013.01); *B29C 64/106* (2017.08); *B29C 64/188* (2017.08); *E04B 2/84* (2013.01); *E04C 1/00* (2013.01); *B29C 47/0002* (2013.01); *B29C 47/003* (2013.01); *B29C 47/0038* (2013.01); *B29C 2793/0027* (2013.01); *B29C 2947/926* (2013.01); *B29C 2947/92514* (2013.01); *B29C 2947/92571* (2013.01); *B29C 2947/92904* (2013.01); *B33Y 10/00* (2014.12); *Y10T 428/24992* (2015.01)

(58) Field of Classification Search
CPC ..... B29C 64/106; B29C 64/188; B33Y 10/10; B33Y 30/00; E04B 1/3505; E04B 2/84
See application file for complete search history.

(56) References Cited

U.S. PATENT DOCUMENTS

| | | | | |
|---|---|---|---|---|
| 3,767,336 A | * | 10/1973 | Casey | B29C 67/20 264/309 |
| 3,897,298 A | * | 7/1975 | Gray | E04B 1/166 156/500 |
| 3,914,077 A | * | 10/1975 | Lodes | B29C 67/20 118/111 |
| 4,372,733 A | * | 2/1983 | Tinning | E04G 11/34 264/32 |
| 4,749,347 A | | 6/1988 | Valavaara | |
| 5,656,230 A | | 8/1997 | Khoshnevis | |
| 6,205,731 B1 | | 3/2001 | Gerhaher | |
| 7,153,454 B2 | | 12/2006 | Khoshnevis | |
| 7,452,196 B2 | | 11/2008 | Khoshnevis | |
| 7,574,925 B2 | | 8/2009 | Khoshnevis | |
| 7,641,461 B2 | | 1/2010 | Khoshnevis | |
| 7,814,937 B2 | | 10/2010 | Khoshnevis | |
| 7,837,378 B2 | | 11/2010 | Khoshnevis | |
| 7,841,849 B2 | | 11/2010 | Khoshnevis | |
| 7,841,851 B2 | | 11/2010 | Khoshnevis | |
| 7,850,388 B2 | | 12/2010 | Khoshnevis | |
| 7,874,825 B2 | | 1/2011 | Khoshnevis | |
| 8,029,710 B2 | | 10/2011 | Khoshnevis | |
| 9,206,601 B2 | | 12/2015 | Khoshnevis | |
| 2004/0021246 A1 | | 2/2004 | Khoshnevis | |
| 2004/0164436 A1 | | 8/2004 | Khoshnevis | |
| 2005/0196482 A1 | | 9/2005 | Khoshnevis | |
| 2007/0138678 A1 | | 6/2007 | Khoshnevis | |
| 2007/0138687 A1 | | 6/2007 | Khoshnevis | |
| 2007/0148006 A1 | | 6/2007 | Khoshnevis | |
| 2007/0181519 A1 | | 8/2007 | Khoshnevis | |
| 2007/0286674 A1 | | 12/2007 | Khoshnevis | |
| 2008/0017663 A1 | | 1/2008 | Khoshnevis | |
| 2009/0043424 A1 | | 2/2009 | Khoshnevis | |
| 2009/0134539 A1 | | 5/2009 | Khoshnevis | |
| 2009/0134540 A1 | | 5/2009 | Khoshnevis | |
| 2010/0025349 A1 | | 2/2010 | Khoshnevis | |
| 2017/0350115 A1 | * | 12/2017 | Rocher | E04B 1/3505 |

OTHER PUBLICATIONS

US International Searching Authority (ISA/US). 2008. International Search Report and Written Opinion of the International Searching Authority, dated Dec. 24, 2008, for PCT Application PCT/US2008/080976.

\* cited by examiner

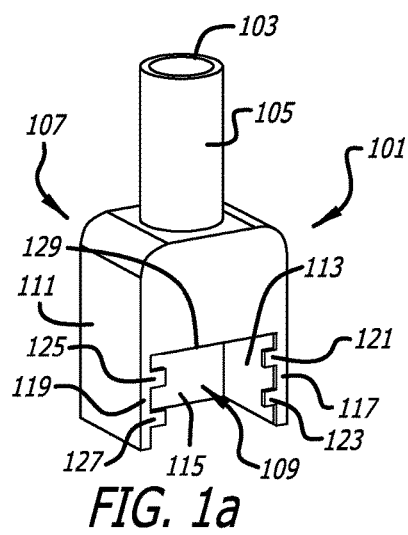
FIG. 1a
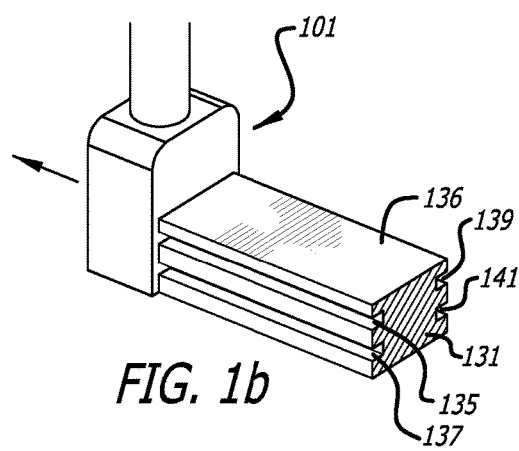
FIG. 1b
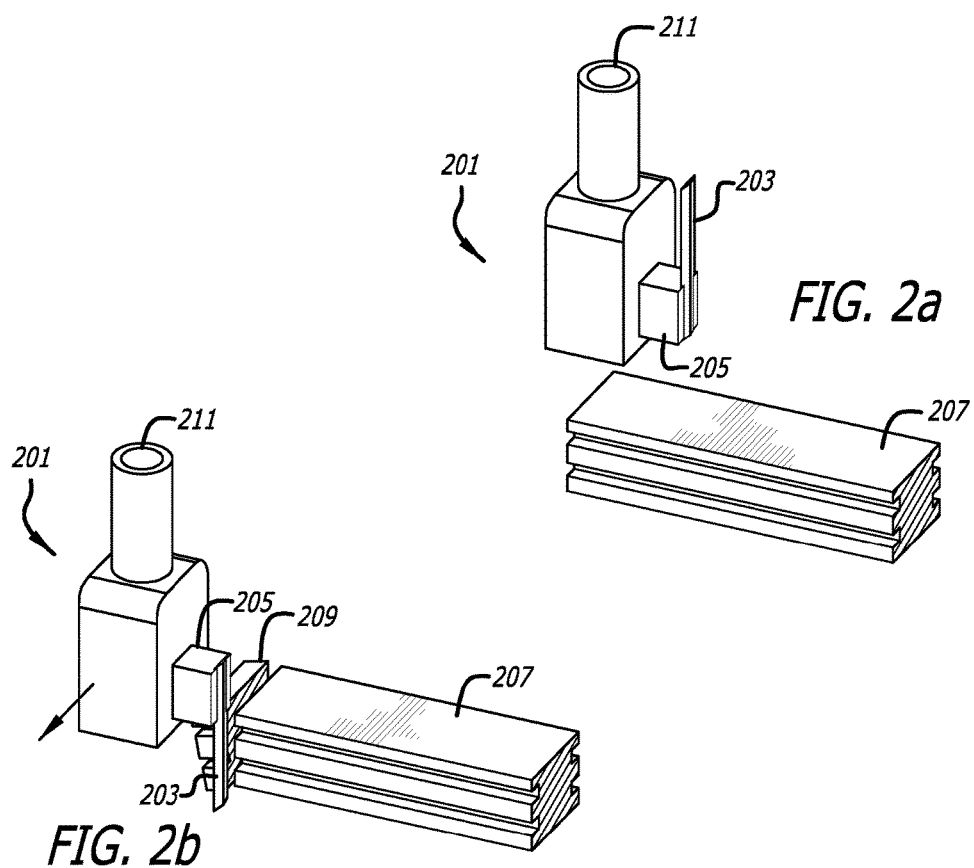
FIG. 2a
FIG. 2b

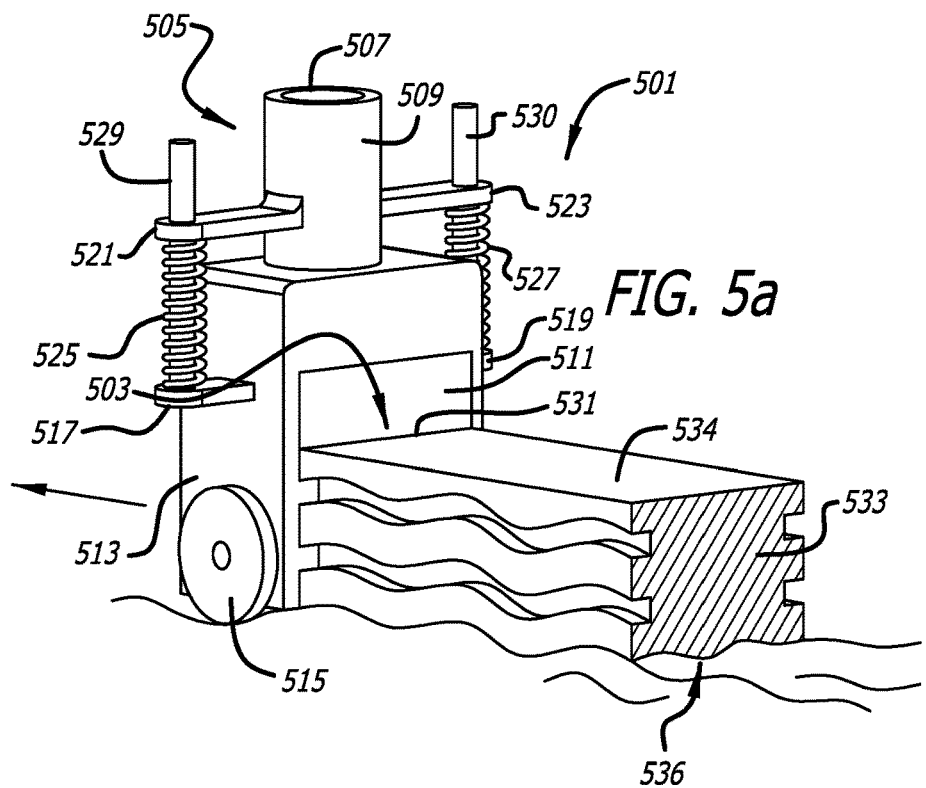
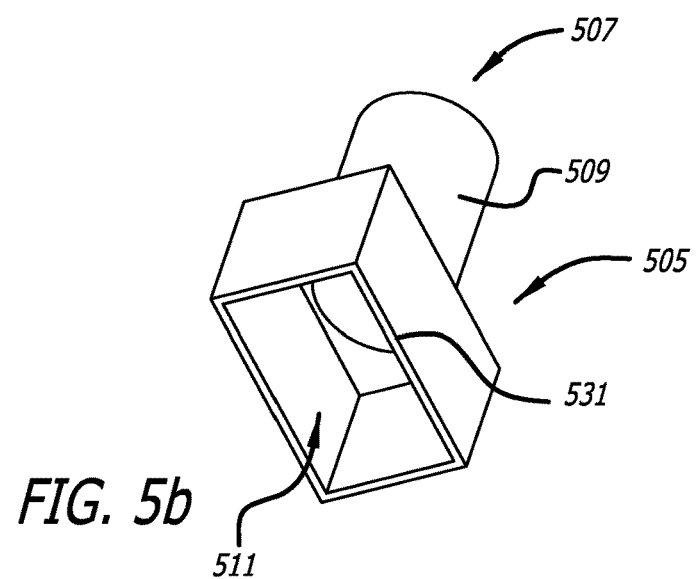

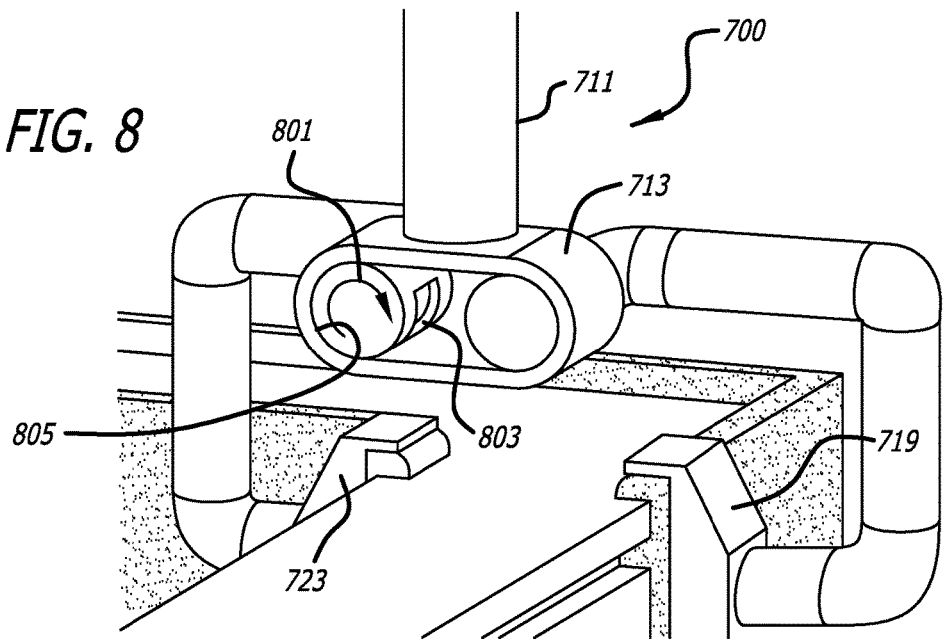
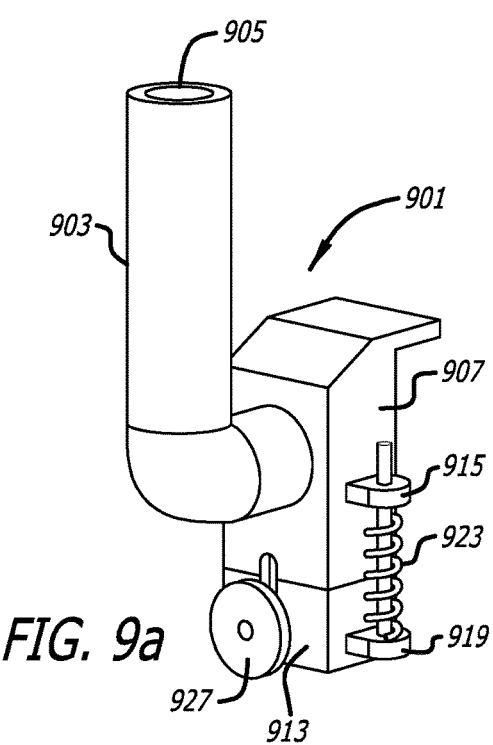
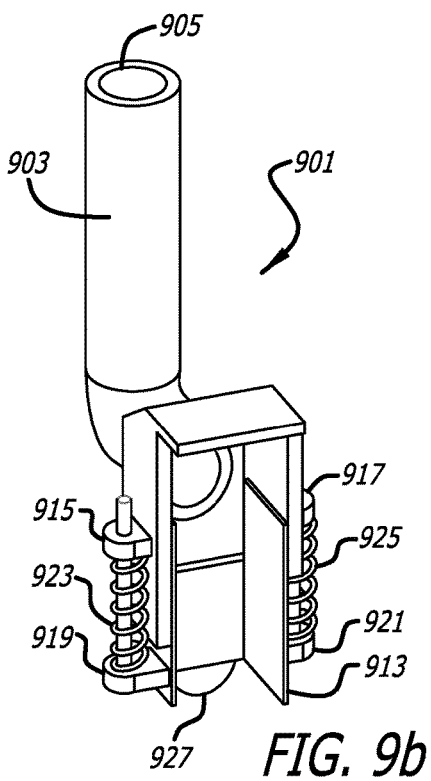

CONTOUR CRAFTING EXTRUSION NOZZLES

CROSS-REFERENCE TO RELATED APPLICATION(S)

This application is a continuation of U.S. patent application Ser. No. 14/316,492, filed Jun. 26, 2014 (issuing Dec. 8, 2015 as U.S. Pat. No. 9,206,601), which is a continuation of U.S. patent application Ser. No. 12/739,137, filed 21 Apr. 2010, entitled "Contour Crafting Extrusion Nozzles," which is a U.S. 371 National Phase filing of PCT Application No. PCT/US2008/080976, entitled "Contour Crafting Extrusion Nozzles," filed 23 Oct. 2008, which is based upon and claims priority to U.S. Provisional Patent Application No. 60/982,378, entitled "Nozzles for Contour Crafting of Walls," filed Oct. 24, 2007, and U.S. Provisional Patent Application No. 60/990,581, filed Nov. 27, 2007, entitled "Methods for Sensing Viscous Fluid Flow Rate,". The entire content of each of these applications is incorporated herein by reference.

U.S. patent application Ser. No. 12/739,137 is also a continuation-in-part application of the following:

U.S. patent application Ser. No. 11/040,401, entitled "Robotic Systems for Automated Construction," filed Jan. 21, 2005 (issued Jan. 5, 2010 as U.S. Pat. No. 7,641,461); which claims priority to U.S. Provisional Application Ser. No. 60/537,756, entitled "Automated Construction Using Extrusion," filed Jan. 20, 2004;

U.S. patent application Ser. No. 11/040,602, entitled "Automated Plumbing, Wiring, and Reinforcement," filed Jan. 21, 2005 (issued Nov. 18, 2008 as U.S. Pat. No. 7,452,196); which claims priority to U.S. Provisional Application Ser. No. 60/537,756, entitled "Automated Construction Using Extrusion," filed Jan. 20, 2004;

U.S. patent application Ser. No. 11/040,518, entitled "Mixer-Extruder Assembly," filed Jan. 21, 2005, which claims priority to U.S. Provisional Application Ser. No. 60/537,756, entitled "Automated Construction Using Extrusion," filed Jan. 20, 2004;

U.S. patent application Ser. No. 11/552,885, entitled "Extruded Wall with Rib-Like Interior," filed Oct. 25, 2006, which claims priority to U.S. Provisional Application No. 60/730,560, entitled "Contour Crafting Nozzle and Features for Fabrication of Hollow Structures," filed Oct. 26, 2005;

U.S. patent application Ser. No. 11/552,741, entitled "Deployable Contour Crafting," filed Oct. 25, 2006, which claims priority to U.S. Provisional Application No. 60/730,418, entitled "Deployable Contour Crafting Machine," filed Oct. 26, 2005;

U.S. patent application Ser. No. 11/556,027, entitled "Material Delivery System Using Decoupling Accumulator," filed Nov. 2, 2006, which claims priority to U.S. Provisional Application No. 60/733,451, entitled "Material Delivery Approaches for Contour Crafting," filed Nov. 4, 2005;

U.S. patent application Ser. No. 11/556,048, entitled "Dry Material Transport and Extrusion," filed Nov. 2, 2006, which claims priority to U.S. Provisional Application No. 60/733,451, entitled "Material Delivery Approaches for Contour Crafting," filed Nov. 4, 2005;

U.S. patent application Ser. No. 11/733,096, entitled "Compliant, Low Profile, Independently Releasing, Non-Protruding and Genderless Docking System for Robotic Modules," filed Apr. 9, 2007, which claims priority to U.S. Provisional Application No. 60/744,483, "Compliant, Low Profile, Non-Protruding, and Genderless Docking System for Robotic Modules," filed Apr. 7, 2006;

U.S. patent application Ser. No. 11/780,978, entitled "Bag Lifting and Emptying System," filed Jul. 20, 2007, which claims priority to U.S. Provisional Application No. 60/807,867, entitled "Lifting and Emptying System for Bagged Materials," filed Jul. 20, 2007;

U.S. patent application Ser. No. 11/934,507, entitled "Gantry Robotics System and Related Material Transport for Contour Crafting," filed Nov. 2, 2007, which claims priority to U.S. Provisional Application No. 60/864,293, entitled "Gantry Robotics System and Related Material Transport for Contour Crafting," filed Nov. 3, 2006; and U.S. patent application Ser. No. 11/933,985, entitled "Metering and Pumping Devices," filed Nov. 1, 2007, (issued Aug. 18, 2009 as U.S. Pat. No. 7,574,925); which claims priority to U.S. Provisional Application No. 60/864,060, entitled "Metering and Pumping Devices," filed Nov. 3, 2006.

This application is also related to U.S. Pat. No. 7,153,454, entitled "Multi-Nozzle Assembly for Extrusion of Wall," issued Dec. 26, 2006.

The entire content of all of the aforementioned patent applications and patents is incorporated herein by reference.

BACKGROUND

Field

This disclosure relates to construction of structures, such as walls and buildings. This disclosure also relates to extrusion of construction material and devices and apparatus that are involved in such a process, including extrusion nozzles.

Description of Related Art

Constructing homes, offices, and other structures has an ancient heritage. Despite centuries of development, however, construction can still be very labor intensive. Even a modest sized structure may require the efforts of numerous workers. The appearance and quality of several structures built from the same design may also vary due to differences in the skills, efforts, supervision, and techniques employed by their builders. Construction may also waste material. When standard off-the-shelf lengths of wood is used, for example, the wood may have to be cut to meet design requirements. Construction may also be hazardous. Construction workers may be killed or seriously injured.

These problems gave rise to the nozzle assemblies disclosed in U.S. Pat. No. 7,153,454, issued Dec. 26, 2006, entitled "Multi-Nozzle Assembly for Extrusion of Wall," as well as the related equipment and methods disclosed in the patent applications cited above.

These patent applications and patent collectively disclose equipment and methods for automatically constructing buildings by extruding construction material, layer by layer, from one or more extrusion nozzles. These nozzles may be manipulated by robots under computer control. The process has become known as "Contour Crafting."

Such advancements have brought with them corresponding challenges. For example, it may be challenging to extrude walls which have multiple layers, such as an internal core of insulation, a stucco exterior, and a plastered interior. It may also be challenging to craft openings in such extruded walls for such components as windows and doors. It may also be challenging to create a uniform and level base layer when the underlying surface is uneven.

SUMMARY

An automated extrusion construction system may include an extrusion nozzle configured to extrude construction material in a substantially horizontal direction against an elongated and substantially vertical surface. The construction system may include a nozzle positioning system configured to controllably move the extrusion nozzle to different positions. The construction system may include a controller. The controller may be configured to direct the nozzle positioning system to move the extrusion nozzle across the substantially vertical surface in a substantially horizontal direction while the extrusion nozzle is extruding the construction material. This may cause a substantially horizontal strip of the construction material to be extruded from the extrusion nozzle onto the substantially vertical surface.

The processing system may be configured to direct the nozzle positioning system to repeatedly move the extrusion nozzle across the substantially vertical surface in the substantially horizontal direction while the extrusion nozzle is extruding the construction material. This may cause a plurality of substantially stacked and substantially horizontal strips of the construction material to be extruded from the extrusion nozzle onto the substantially vertical surface.

The extrusion nozzle may have an outlet from which the construction material is extruded. The outlet may be substantially rectangular in shape. The outlet may have a leading perimeter edge which is in the front of and a trailing perimeter edge which is at the rear of the extrusion nozzle during its horizontal movement. The outlet may be configured such that the leading perimeter edge extends laterally further than the trailing perimeter edge. The outlet may have a top perimeter edge which is at the top of the extrusion nozzle during its horizontal movement. The outlet may be configured such that the top perimeter edge extends laterally further than both the leading and trailing perimeter edges.

The substantially vertical surface may be part of a structure that has a substantially horizontal upper surface. The processing system may be configured to cause an upper portion of the outlet to extend above the horizontal surface while the extrusion nozzle moves across the substantially vertical surface in the substantially horizontal direction.

An extrusion nozzle assembly may include a first extrusion nozzle configured to extrude construction material in a first substantially horizontal direction against a first elongated and substantially vertical surface. The extrusion nozzle assembly may include a second extrusion nozzle configured to extrude construction material in a second substantially horizontal direction that is substantially opposite of the first substantially horizontal direction against a second elongated and substantially vertical surface that is substantially parallel to and spaced apart from the first vertical surface.

The extrusion nozzle may include an actuator mechanism configured to controllably move the second extrusion nozzle from an extrusion position at which the second extrusion nozzle is positioned to extrude the construction material in the second substantially horizontal direction to a non-extrusion position at which the second extrusion nozzle is not positioned to extrude the construction material in the second substantially horizontal direction. The non-extrusion position may be such as to prevent the second extrusion nozzle from contacting an interior corner of the second vertical surface while the first extrusion nozzle extrudes the construction material against an outer corner of the first vertical surface.

The extrusion nozzle may include a valve configured to cut off flow of the construction material to the second extrusion nozzle when the second extrusion nozzle is in the non-extrusion position.

An automated extrusion construction system may include a first extrusion nozzle configured to extrude a first construction material so as to form a substantially horizontal extruded layer having an elongated and substantially vertical surface. The automated extrusion construction system may include a second extrusion nozzle configured to extrude a second construction material in a substantially horizontal direction against the vertical surface so as to form a substantially horizontal strip of the second construction material on the vertical surface. The automated extrusion construction system may include a nozzle positioning system configured to controllably move the first and second extrusion nozzles to different positions. The automated extrusion construction system may include a controller. The controller may be configured to direct the nozzle positioning system to move the first extrusion nozzle in the substantially horizontal direction so as to form the substantially horizontal extruded layer and to move the second extrusion nozzle in the substantially horizontal direction against the vertical surface so as to form the substantially horizontal strip.

The controller may be configured to direct the nozzle positioning system to cause the second extrusion nozzle to move in synchronism with and behind the first extrusion nozzle. This may cause the second extrusion nozzle to extrude the substantially horizontal strip on the substantially vertical surface of the horizontal extruded layer extruded during the same horizontal traverse by the first extrusion nozzle.

The first extrusion nozzle may be configured to cause at least one longitudinal channel to be formed in the vertical surface of the extruded layer. The second extrusion nozzle may be configured to extrude the horizontal strip with a longitudinal locking bead that interlocks with the longitudinal channel.

The automated extrusion construction system may include a slicing mechanism configured to controllably slice through the extruded layer. The positioning system may be configured to controllably move the slicing mechanism to different positions. The controller may be configured to direct the positioning system to move the slicing mechanism so as to slice through the extruded layer in a direction that is substantially perpendicular to the horizontal direction at a first set of two spaced-apart locations.

The controller may be configured to direct the positioning system to move the extrusion nozzle in a substantially horizontal direction so as to form a second substantially horizontal extruded layer substantially on top of the first horizontal extruded layer. The controller may be configured to direct the positioning system to move the slicing mechanism so as to slice through the second extruded layer at two spaced-apart locations, each immediately above one of the two spaced-apart locations in the first set of spaced-apart locations.

The slicing mechanism may include a cutting blade and/or a cutting cable.

The slicing mechanism may be attached to the extrusion nozzle.

The automated extrusion construction system may include an actuator mechanism configured to move the slicing mechanism between a cutting position at which the slicing mechanism is oriented to slice through the extruded layer and a non-cutting position at which the slicing mechanism is oriented so as to avoid cutting through the extruded layer while it is being extruded by the extrusion nozzle.

The slicing mechanism may be configured to vibrate while slicing.

A process for constructing a wall having a rectangular opening therein may include extruding a substantially horizontal layer of construction material and covering the upper surface of the extruded layer across the portion thereof which lies at the bottom of the desired rectangular opening with a layer of anti-adhesion material. The process may include extruding one or more additional substantially horizontal layers of construction material, each on top of the preceding extruded layer, until the top of the last extruded layer substantially coincides with the top of the rectangular opening. The process may include slicing though each of the one or more additional extruded layers at locations which coincide with the left and right sides of the rectangular openings after each of the one or more additional extruded layer are extruded but before the next later is extruded. The process may include covering the upper surface of the last extruded layer across the portion thereof immediately below the top of the desired rectangular opening with a layer of anti-adhesion material. The process may include extruding one or more additional substantially horizontal layers of construction material, each on top of the preceding extruded layer. The process may include pushing out the block of extruded layers at the location of the rectangular opening, thus creating the rectangular opening in the wall.

The anti-adhesion material may be plastic.

The anti-adhesion material may be sprayed on.

The slicing may be performed with a vibrating slicing mechanism.

A wall may have a rectangular opening therein. The wall may have one or more stacked layers of extruded construction material below the rectangular opening. The wall may have one or more stacked layers of extruded construction material to the right and to the left of the rectangular opening substantially spanning the height of the rectangular opening. The wall may have one or more stacked layers of extruded construction material above the rectangular opening, whereby the top of the rectangular opening constitutes the extruded layer immediately above it and does not contain a non-extruded horizontal header which spans a width greater than the size of the rectangular opening.

The opening may be sized for a window or a door.

An extrusion nozzle may include an outlet configured to extrude construction material in a substantially horizontal direction. The outlet may have an adjustable height. The extrusion nozzle may have a height adjustment mechanism coupled to the outlet and configured to adjust the height of the outlet in response to level deviations in the surface on which the construction material is extruded by the extrusion nozzle.

The height adjustment mechanism may include at least one wheel configured to ride on top of the surface on which the construction material is extruded while the construction material is extruded from the outlet. The outlet may have a bottom edge and the wheel may have a radius which is large enough to cause the perimeter of the wheel to protrude beneath the bottom edge of the outlet.

The outlet may include two portions that are configured to slide with respect to one another and to vary the height of the outlet based on their relative position with respect to one another.

The extrusion nozzle may include at least one spring configured to urge the two portions apart from one another so as to maximize the height of the outlet when no external force is applied between the two portions.

An automated extrusion construction system may include a controller configured to direct a nozzle positioning system to move an extrusion nozzle in a substantially horizontal direction while the extrusion nozzle is extruding the construction material so as cause a substantially horizontal strip of the construction material to be extruded from the extrusion nozzle that has an upper surface that is at a uniform level and a lower surface that substantially tracks the level deviations in the surface on which the construction material is extruded.

An extruded strip of construction material may have an upper surface that is at a uniform level and a lower surface that substantially tracks deviations in a surface on which the extruded strip is resting. The extruded strip may have been formed without the aid of a mould.

A process for extruding construction material onto a surface that has level deviations comprising moving an extrusion nozzle in a substantially horizontal direction while extruding the construction material from an outlet in the extrusion nozzle so as to cause the upper surface of the extrudate to be at a substantially uniform level and the lower surface of the extrudate to substantially track the level deviations in the surface below, all without using a mould to contain both of the sides of the extruded material after it is extruded from the extrusion nozzle.

The width of the extrudate may be substantially constant along its length.

The process may include traversing the extrusion nozzle across the same horizontal path a plurality of times at different vertical levels while extruding the construction material therefrom so as to form a wall having a level top and a bottom that substantially tracks the level deviations in the surface below.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings disclose illustrative embodiments. They do not set forth all embodiments. Other embodiments may be used in addition or instead. Details that may be apparent or unnecessary may be omitted to save space or for more effective illustration. Conversely, some embodiments may be practiced without all of the details that are disclosed. When the same numeral appears in different drawings, it is intended to refer to the same or like components or steps.

FIG. 1(a) illustrates an extrusion nozzle configured to extrude an internal extruded layer.

FIG. 1(b) illustrates the extrusion nozzle illustrated in FIG. 1(a) extruding an internal extruded layer.

FIG. 2(a) illustrates an extrusion nozzle with a slicing mechanism that includes a cutting blade and an associated actuator mechanism.

FIG. 2(b) illustrates the extrusion nozzle illustrated in FIG. 2(a) cutting an extruded layer.

FIG. 5(a) illustrates an extrusion nozzle configured to extrude an extruded layer that has a level top surface and a depth that conforms to contours of an uneven ground surface below.

FIG. 5(b) illustrates a fixed portion of an outlet that forms a part of the extrusion nozzle illustrated in FIG. 5(a).

FIG. 8 illustrates an internal shut-off valve that may be used in the dual extrusion nozzle assembly illustrated in FIGS. 7(a)-7(d).

FIGS. 9(a) and (b) illustrate an extrusion nozzle configured to extrude an extruded surfacing layer that has a level top surface and a depth that conforms to contours of an uneven ground surface below.

DETAILED DESCRIPTION OF ILLUSTRATIVE EMBODIMENTS

Figure 3A:
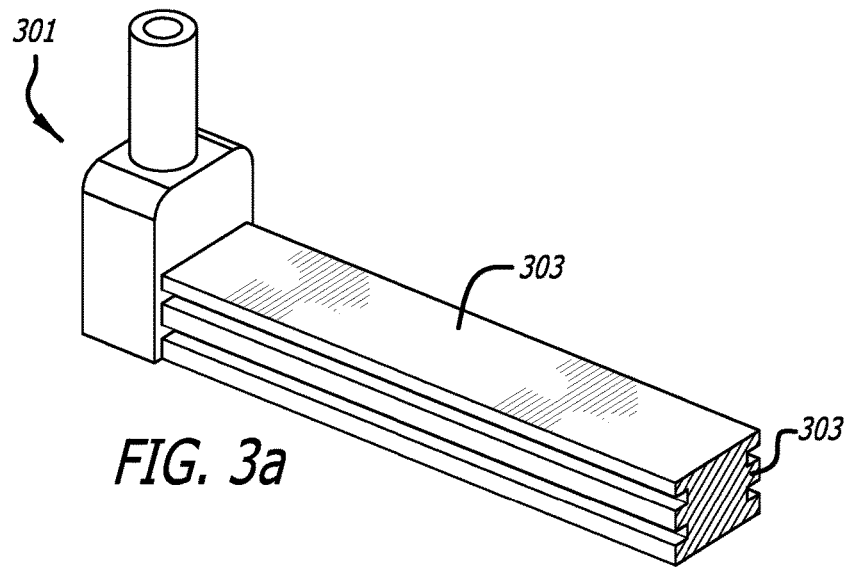
FIGS. 3(a)-3(g) illustrate an extrusion nozzle and an associated slicing mechanism being used to form an opening in an extruded wall formed from stacked extruded layers.

Illustrative embodiments are now discussed. Other embodiments may be used in addition or instead. Details that may be apparent or unnecessary may be omitted to save space or for a more effective presentation. Conversely, some embodiments may be practiced without all of the details that are disclosed.

FIG. 1(a) illustrates an extrusion nozzle configured to extrude an internal extruded layer. An extrusion nozzle 101 may include an inlet 103, a tube 105, a housing 107 which has an outlet 109, side trowels 111 and 113, a rear wall 115, side trowels 117 and 119, and channel protrusions 121, 123, 125 and 127.

Construction material, such as cementitious material, foam, plaster, stucco, may be delivered in a viscous fluidic state into the inlet 103. This material may then be extruded through the outlet 109. The side trowels 117 and 119 may serve to shape the extrudate, along with the channel protrusions 121, 123, 125, and 127.

The construction material which is delivered to the inlet 103 may be mixed with a hardener that causes it to harden after it is extruded from the outlet 109. One or more additives may be mixed with the construction material in order to accelerate or de-accelerate the hardening time.

FIG. 1(b) illustrates the extrusion nozzle illustrated in FIG. 1(a) extruding an extruded layer. As illustrated in FIG. 1(b), the extrusion nozzle 101 may extrude an extruded layer 131. The extruded layer 131 may be substantially horizontal and may have an upper surface 136 that is also substantially horizontal. The extruded layer 131 may include one or more longitudinal channels, such as longitudinal channels 135, 137, 139, and 141. These channels may be used for interlocking with surfacing layers that may be applied to the vertical surfaces of the extruded layer 131, as will become more clear in connection with the discussion of FIGS. 7(a)-7(d) below. The extruded layer 131 may instead not have any longitudinal channels and/or may be configured to stand without any surfacing layers or with only a single surfacing layer. The extruded layer 131 may be oriented other than in a horizontal position.

The number, position, and cross-section of the longitudinal channels 135, 137, 139, and 141 may vary. The number, position and shape of the corresponding channel protrusions 121 and 123 in the side trowel 117 and the channel protrusions 125 and 127 in the side trowel 119 may vary to match. For example, the trowels 117 and 119 may be configured to provide no longitudinal channels, to provide longitudinal channels having a different cross-section, to provide longitudinal channels on only one vertical face of the extruded layer 131, or to provide no longitudinal channels. The upper trowel may similarly be configured with one or more protrusion to provide longitudinal channels in the top surface of the extruded layer 136.

The shape and position of the side trowels 117 and 119 and the upper trowel 129 and their associated protrusions are illustrated as being fixed. In other configurations, one or more server motors, solenoids, pneumatic actuators, hydraulic actuators, or other controlled devices may be used to make them adjustable. Manually-adjustable mechanisms may be used instead.

The extrusion nozzle 101 may move in a horizontal direction along a straight line, as illustrated in FIG. 1(b). It may instead be moved in other directions and/or along pathways which are not linear, thus creating extruded layers which themselves are not linear or horizontal.

FIG. 2(a) illustrates an extrusion nozzle with a slicing mechanism that includes a cutting blade and an associated actuator mechanism. FIG. 2(b) illustrates the extrusion nozzle illustrated in FIG. 2(a) cutting an extruded layer.

As illustrated in FIG. 2(a), an extrusion nozzle 201 may include a cutting blade 203 controlled by an actuator mechanism 205. The extrusion nozzle 201 may be of the type illustrated in FIG. 1(a) or may be of any other type.

The extrusion nozzle 201 may be operated so as to extrude construction material, thereby forming an extruded layer 207. During this process, the actuator mechanism 205 may cause the cutting blade 203 to be in a non-cutting position during which the extrusion nozzle 201 may extrude the construction material without interference from the cutting blade 203.

After the extruded layer 207 is extruded, the actuator mechanism may cause the cutting blade 203 to move from the non-cutting position to a cutting position at which the cutting blade 203 may be oriented to slice through the extruded layer 207, as illustrated in FIG. 2(b). While in this position, the extrusion nozzle 201 may be moved immediately above the extruded layer 207 and may then be caused to traverse across it, thereby slicing an undesirable portion 209 from the extruded layer 207, as illustrated in FIG. 2(b). During this slicing operation, the delivery of construction material to an inlet 211 of the extrusion nozzle may be halted.

The cutting blade 203 may be attached to the extrusion nozzle 201, as illustrated in FIGS. 2(a) and 2(b). It may instead be separate from the extrusion nozzle 201 and operated independently so as to effectuate the same slicing action as is illustrated in FIG. 2(b).

The actuator mechanism 205 may be of any type. For example, it may be configured to longitudinally slide the cutting blade 203 from an elevated position to a lowered position, as illustrated in FIGS. 2(a) and 2(b), respectively. The actuator mechanism 205 may instead be configured to rotate the cutting blade 203 from its elevated position to its lowered position. Any type of device may be used for the actuator mechanism, such as a server motor, solenoid, pneumatic actuator, hydraulic actuator, and/or any combination of these.

FIGS. 3(a)-3(g) illustrate an extrusion nozzle and an associated slicing mechanism being used to form an opening in an extruded wall formed from stacked extruded layers. As illustrated in FIG. 3(a), an extrusion nozzle 301 may be used to extrude a first extruded layer 303. The extrusion nozzle 301 may be of the type illustrated in FIG. 1(a) or may be of any other type. The extruded layer 303 may be of any size or configuration.

Figure 3B:
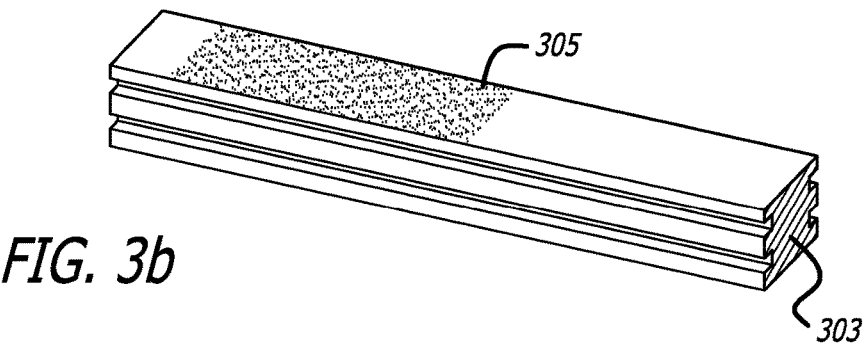

After the first extruded layer 303 is extruded, an anti-adhesion layer 305 may be applied to the upper surface of the first extruded layer 303 across the portion thereof which lies at the bottom of the desired rectangular opening that is to be formed, as illustrated in FIG. 3(b). The anti-adhesion layer 305 may be of any type of material that reduces the tendency of a second extruded layer that is extruded on top of the first extruded layer 303 to stick to the upper surface of the first extruded layer 303 at the location of the anti-adhesion layer 305. For example, the anti-adhesion layer 305 may be plastic or wax. The anti-adhesion layer may be applied by spraying. It may instead be a sheet of material that is placed at the appropriate location. The anti-adhesion layer 305 may be applied by automated or by manual means.

Figure 3C:
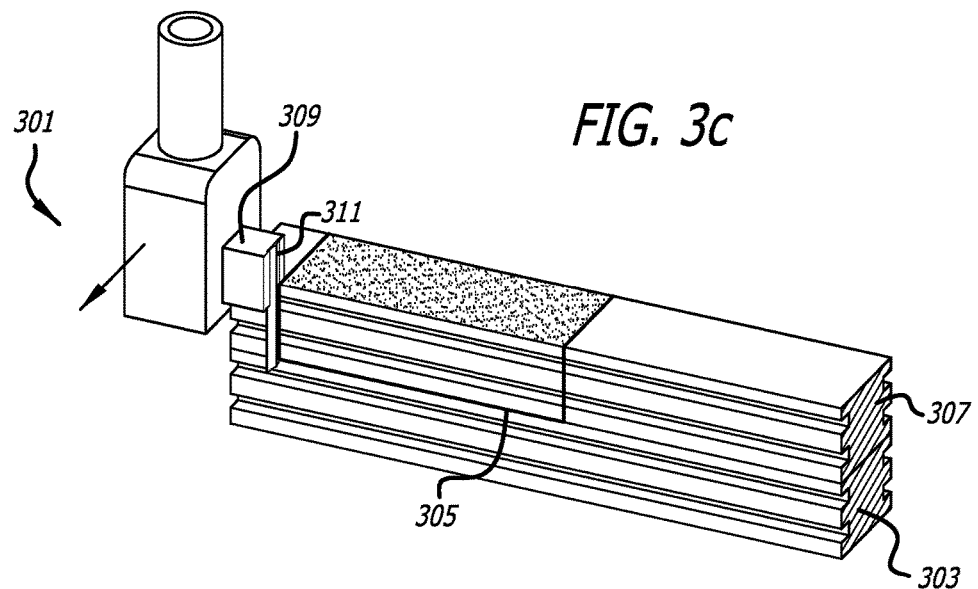

A second extruded layer 307 may be extruded from the extrusion nozzle 301 directly above the first extruded layer 303, as illustrated in FIG. 3(c). Thereafter, an actuator mechanism 309 that may be part of the extrusion nozzle 301 may be operated to cause a slicing mechanism, such as a cutting blade 311, to move from the non-cutting position illustrated in FIG. 3(a) to the cutting position illustrated in FIG. 3(c). The actuator mechanism 309 and the cutting blade 311 may be of the same type as illustrated in FIG. 2(a) or may be of any other type.

While in the cutting position, the extrusion nozzle 301 may be moved transverse to the second extruded layer 307 at two spaced-apart locations that correspond to the location of the sides of the desired rectangular opening, thereby slicing the second extruded layer 307 at these locations, as illustrated in FIG. 3(c).

Figure 3D:
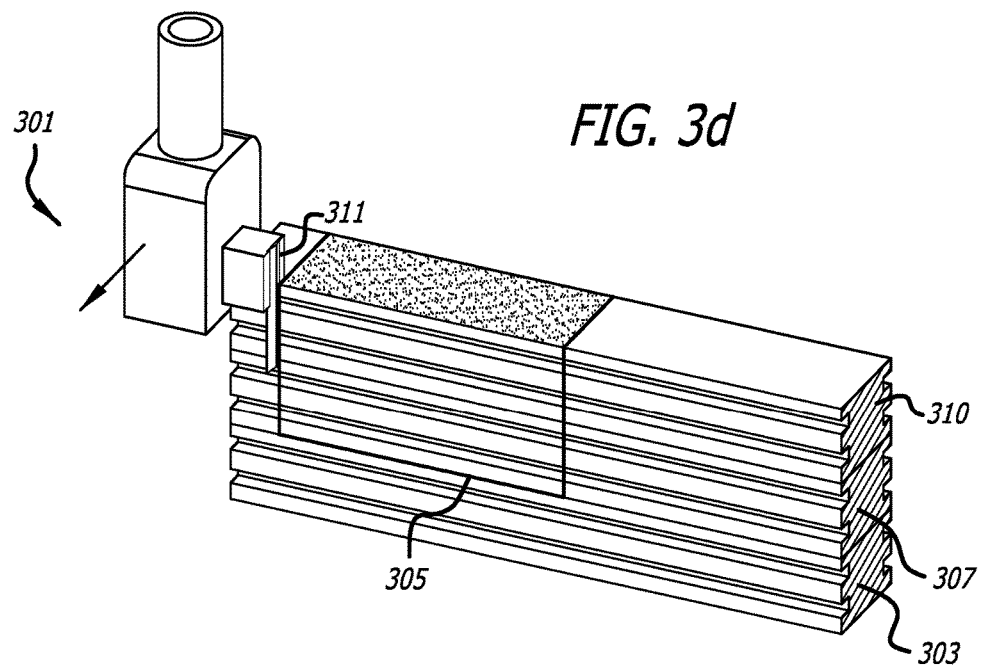
Figure 3E:
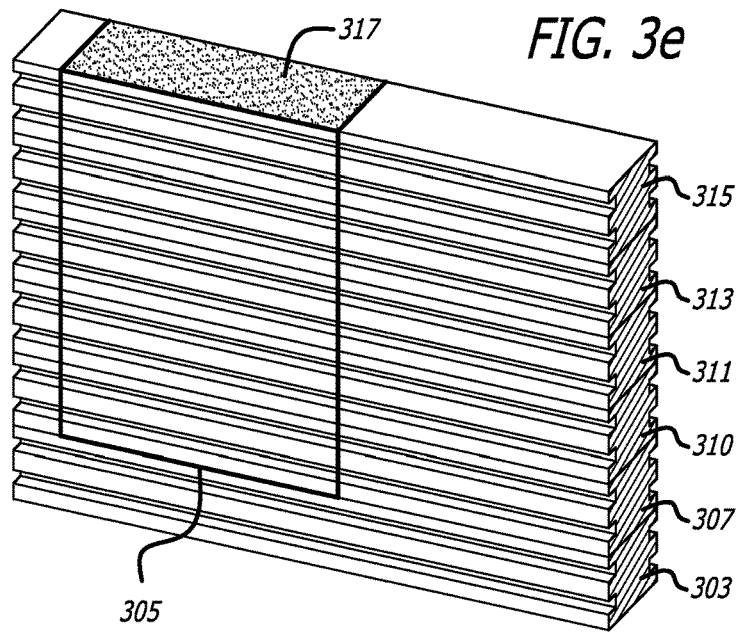

Additional extruded layers may be successively extruded and successively sliced by the extrusion nozzle 301. This may include a third extruded layer 310, as illustrated in FIG. 3(d). As illustrated in FIG. 3(e), it may include a fourth extruded layer 311, a fifth extruded layer 313, and a sixth extruded layer 315. These extruded layers may be successively applied and successively sliced, as illustrated in FIG. 3(e), until the top surface of the last extruded layer is at the top of the desired rectangular opening.

At this point, a second anti-adhesion layer 317 may be applied to the top surface of the last extruded layer immediately below the top of the desired rectangular opening, as illustrated in FIG. 3(e). The anti-adhesion layer 317 may be any of the types and may be applied by any of the methods discussed above in connection with the anti-adhesive layer 305.

Figure 3F:
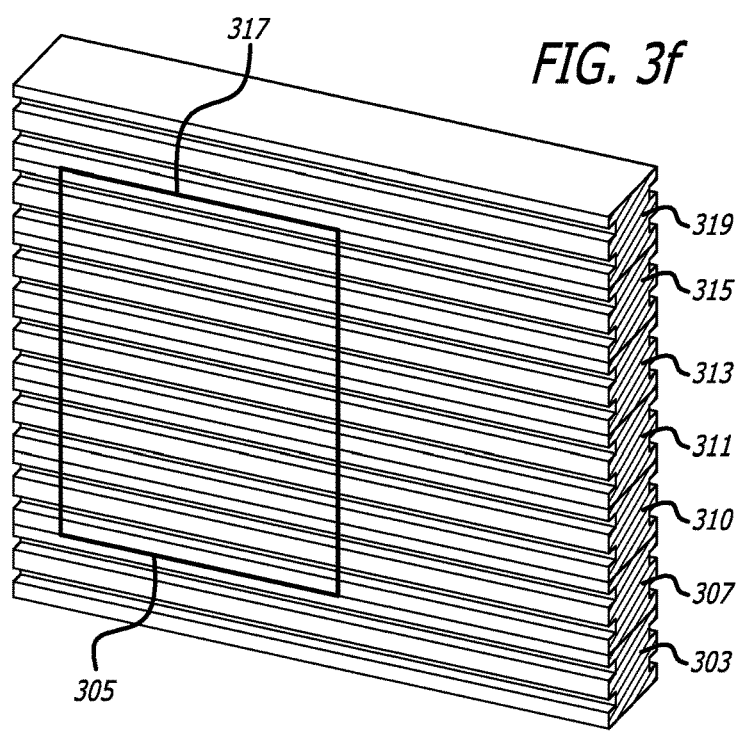

Thereafter, one or more additional extruded layers may be extruded on top of the last extruded layer by the extrusion nozzle 301, as illustrated by a seventh extruded layer 319 in FIG. 3(f). After the extrusions harden, the cut rectangle of extruded material which lies between the two non-adhesion layers 305 and 317 may be pushed out of the wall which has been extruded, leaving a rectangular opening 321 illustrated in FIG. 3(g). The pushing may be done by automated or manual means.

Figure 3G:
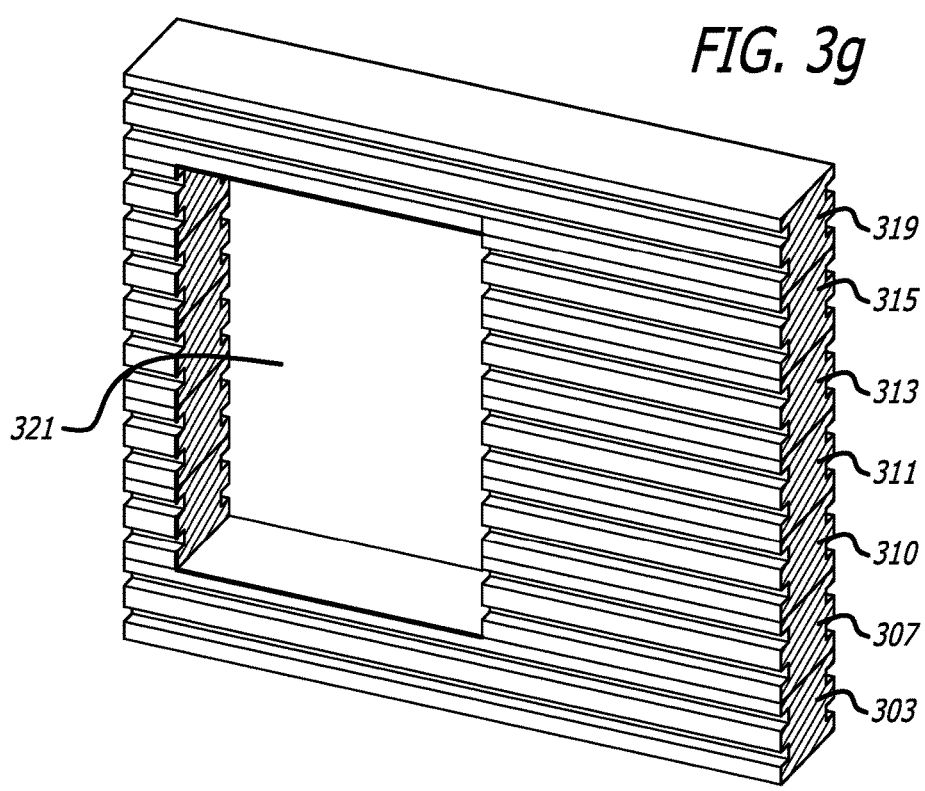

The wall which remains in FIG. 3(g) may consists of a plurality of stacked layers of extruded construction material below the rectangular opening 321. The wall may have one or more stacked layers of extruded construction material to the right and left of the rectangular opening 321 that substantially span the height of the rectangular opening. The wall may have one or more stacked layers of extruded construction material above the rectangular opening 321. The top of the rectangular opening 321 may itself be formed of an extruded layer, such as the seventh extruded layer 319. Using this construction procedure, it may be unnecessary to place a non-extruded horizontal header above the top of the rectangular opening 321 and which extends beyond the opening in order to extrude layers above it.

The rectangular opening 321 may be sized to accommodate construction components of any size, such as a door or a window. Once inserted, the frame of the door, window, or other component may provide additional structural support.

The slicing mechanism has thus-far been illustrated as being a cutting blade, such as the cutting blade 203 in FIG. 2(a) and the cutting blade 311 in FIG. 3(c). Other types of slicing mechanisms may be used in addition or instead. For example, a cutting cable may be used.

Figure 4A:
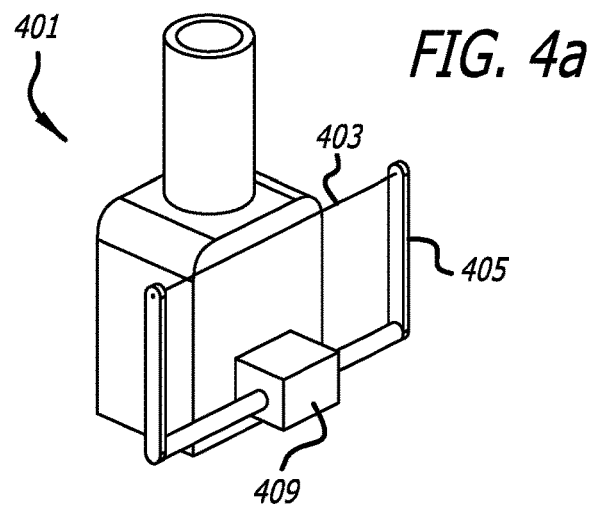
FIGS. 4(a) and 4(b) illustrate an extrusion nozzle with a slicing mechanism that includes a cutting cable and an associated actuator mechanism.
Figure 4B:
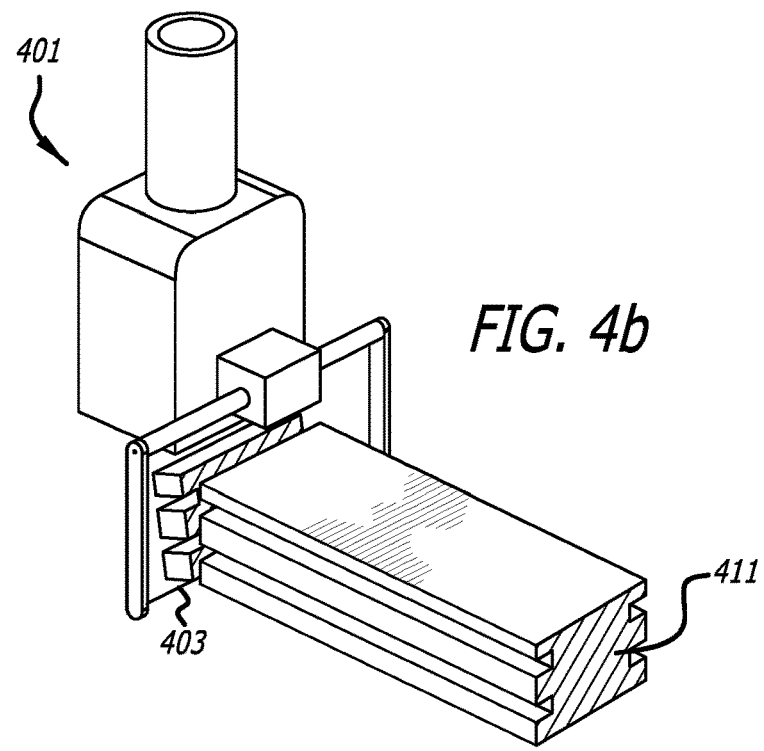

FIGS. 4(a) and 4(b) illustrate an extrusion nozzle with a slicing mechanism that includes a cutting cable and an associated actuator mechanism. As illustrated in FIGS. 4(a) and 4 (b), an extrusion nozzle 401 may have attached to it a cutting cable 403 attached to the extrusion nozzle 401 by a frame 405 through an actuator mechanism 409.

The extrusion nozzle 401 may be the same as the extrusion nozzle 101 illustrated in FIG. 1(a) or may be of any other type. The cutting cable 403 may be made of any material such as steel. It may be saw-toothed, rough, or it may be smooth.

As illustrated in FIGS. 4(a) and 4(b), the actuator mechanism 409 may be configured to move the cutting cable 403 between a non-cutting position at which the slicing mechanism is oriented so as to avoid cutting through an extruded layer while it is being extruded by the extrusion nozzle 401 and a cutting position at which the slicing mechanism is oriented to slice through extruded layer. The actuator mechanism 409 may accomplish this by rotating the frame 405 along a horizontal axis which is either perpendicular or parallel to the direction the extrusion nozzle 401 is moved to extrude an extruded layer 411. All other aspects of the extrusion nozzle 401 and actuator mechanism 409 may be the same as were discussed above in connection with the extrusion nozzles 201 and 301 and actuator mechanism 309, respectively.

The time during which the slicing mechanism slices the extruded layer may vary. In some configurations, the slicing mechanism may be directed to slice the extruded layer immediately after it is extruded. In other configurations, the slicing may be delayed until the extruded layer partially solidifies. In still other configurations, the slicing mechanism may be directed to slice after the extruded layer completely solidifies.

A vibration system may be used to cause the slicing mechanism to vibrate while it is slicing the extruded layer. In some configurations, the vibrating mechanism may be incorporated into the actuator mechanism, such as into the actuator mechanism 205 and/or the actuator mechanism 409. In other configurations, the vibration system may be separate.

The vibration system may be configured to cause the slicing system to vibrate in only one direction. For example, the vibrating system may be configured to cause the slicing mechanism to vibrate along the direction of slicing, so as to minimize deformation of an unhardened extruded layer during slicing. In other configurations, the vibrating system may be configured to vibrate the slicing mechanism in the direction of the longitudinal extruded layer so as to create a gap between the sliced portions of the layer, thereby reducing the chance that the sliced portions will reattach to one another after the slicing mechanism is removed and while the curing process continues. In other configurations, the vibration system may be configured to cause the slicing mechanism to vibrate along the axis of the slicing member. In other configurations, the vibration system may be configured to cause the slicing mechanism to vibrate in a multiple directions, such as in two or more of these directions.

The slicing mechanism may be used for other purposes in addition or instead. For example, the slicing mechanism may be used to construct prefabricated walls that are made of extruded layers at a factory. After the extrusion of each layer, the slicing mechanism may be used to square the beginning and/or end portion of the extruded layer. The slicing mechanism may similarly be used to square the ends of each cascading extruded layer, thereby helping to create a wall module that has squared sides. This squaring process may be used on site as well as in making pre-fabricated structures off site.

The slicing mechanism may be used for other purposes in addition or instead. For example, the slicing mechanism may be used to slice prefabricated structures that are made of extruded layers at a factory into portions that can be more readily shipped as compared to the entire structure. After the extrusion of each layer of the structure, the slicing mechanism may be used to slice the structure at the locations at which the structure is to be divided for shipment purposes. This slicing may be done before each extruded layer fully hardens.

FIG. 5(a) illustrates an extrusion nozzle configured to extrude an extruded layer that has a level top surface and a depth that conforms to the contours of an uneven ground surface below. FIG. 5(b) illustrates a fixed portion of an outlet that forms a part of the extrusion nozzle illustrated in FIG. 5(a).

As illustrated in FIG. 5(a), an extrusion nozzle 501 may have an outlet 503. The extrusion nozzle 501 may be of any type. For example, it may be of the type illustrated in FIG. 1(a). The outlet 503 may have a fixed outlet portion 505 having an inlet 507 to a tube 509 and a lower rectangular outlet 511. The outlet 503 may have a floating outlet portion 513. The fixed outlet portion 505 may slide with respect to the floating outlet portion 513 in a way which causes the height of the outlet 503 to vary based on the relative position between the fixed outlet portion 505 and the floating outlet portion 513.

The extrusion nozzle 501 may include a height adjustment mechanism that is coupled to the outlet 503 and is configured to adjust the height of the outlet 503 in response to level deviations in the surface on which the construction material is extruded by the extrusion nozzle 501. The height adjustment mechanism may include a wheel 515 on one side of the nozzle and a corresponding second wheel (not visible in FIG. 5(a)) on the other side. The wheels may have a radius which is large enough to cause the perimeter of the wheels to protrude beneath the bottom edge of the outlet 503, as illustrated in FIG. 5(a).

The height adjustment mechanism may include arms 517 and 119 attached to the floating outlet portion 513, arms 521 and 523 attach to the fixed outlet portion 505, and springs 525 and 527 supported on rods 529 and 530, respectively. The rods 529 and 530 may be fixedly attached to the arms 517 and 519, respectively, while they may slidingly engage the arms 521 and 523.

The extrusion nozzle 501 may be connected to a nozzle positioning system that may cause the extrusion nozzle to move in a substantially horizontal direction, as illustrated in FIG. 5(a). During this movement, an extruded layer 533 may be extruded and may have a top surface 534 that remain at a constant level, notwithstanding deviations in the level of the surface on which the extruded layer 533 is extruded. This may be facilitated by a lower edge 531 on the fixed outlet portion 505 that remains at a constant level by virtue of it being part of the fixed outlet portion 505 which may be fixedly attached to the nozzle positioning system.

On the other hand, the lower surface 536 of the extruded layer 533 may substantially track the level deviations on the surface on which the construction material is extruded. Deviations in this level may be transmitted through the wheels to the floating outer portion 513 and cause it's position to substantially track deviations in the level of the surface. In turn, this may cause corresponding variations in the overall height of the outlet 503 by causing overall variations in the depth of its side walls.

The small distance between the bottom of the wheel 515 and the bottom edge of the floating outlet portion 513 may help ensure that the floating outlet portion 513 does not collide with the surface below during horizontal traverses, notwithstanding softness in the surface below that may cause the bottom of the wheel 515 to become partially submerged beneath that surface as it travels horizontally.

The springs 525 and 527 may be configured and oriented to urge the wheel 515 and the other corresponding wheel to remain in contact with the surface below as the extrusion nozzle is traversed horizontally, notwithstanding level deviations in the surface below.

The extrusion nozzle 501 may instead have only a single spring and only a single wheel. In this case, the single spring and wheel may be centered along the base of the extrusion nozzle 501, rather than at one end or the other. The outlet and/or height adjustment mechanism may also be differently configured and/or may have different components.

Figure 6A:
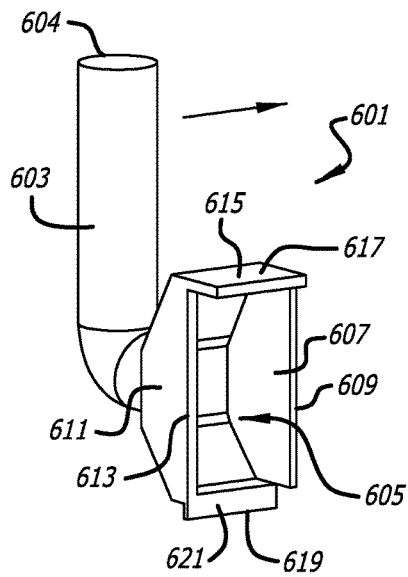
FIG. 6(a) illustrates an extrusion nozzle configured to extrude a extruded surfacing layer laterally onto the side of a surface.
Figure 6B:
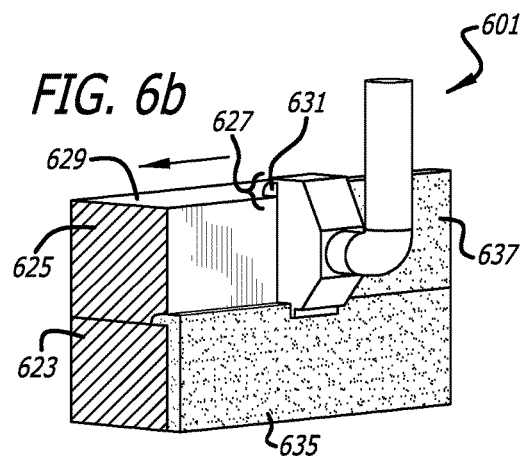
FIGS. 6(b) and 6(c) illustrate the extrusion nozzle illustrated in FIG. 6(a) extruding a stacked extruded surfacing layer onto the side of another stacked extruded layer.

FIG. 6(a) illustrates an extrusion nozzle configured to extrude an extruded surfacing layer laterally onto the side of a substantially vertical surface. FIG. 6(b) illustrates the extrusion nozzle illustrated in FIG. 6(a) extruding stacked extruded surfacing layers onto the side of other stacked extruded layers.

As illustrated in FIG. 6(a), an extrusion nozzle 601 may include a tube 604, an inlet 605 for construction material, and an outlet 605. The outlet may include a leading trowel 607 having a leading perimeter edge 609, a trailing trowel 611 having a trailing perimeter edge 613, a top trowel 615 having a top perimeter edge 617, and a lower trowel 619 having a trowel surface 621.

As illustrated in FIG. 6(a), the leading perimeter edge 609 may extend laterally further than the trailing perimeter edge 613. A top perimeter edge 617 may extend laterally further than both the leading perimeter edge 609 and the trailing perimeter edge 613. The trowel surface 621 of the lower trowel 619 may be at the same level as the trailing perimeter edge 613.

Figure 6C:
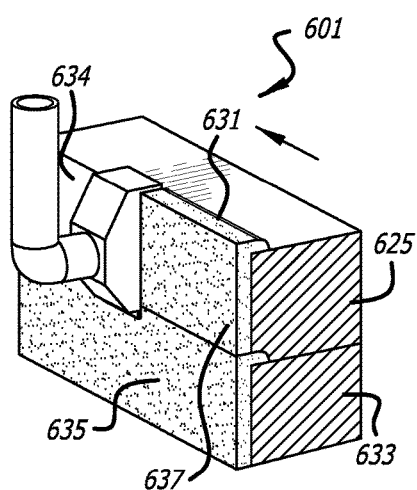
Figure 6D:
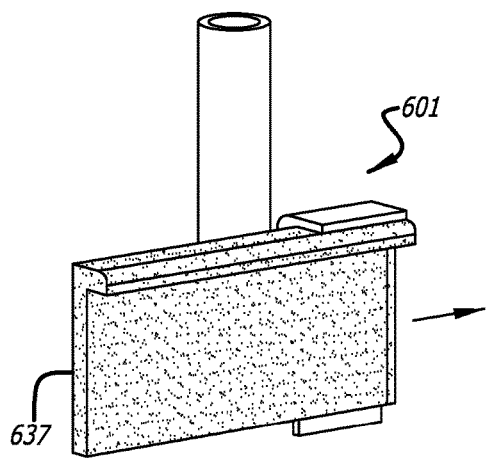
FIG. 6(d) illustrates one of the extruded surfacing layers illustrated in FIGS. 6(b) and 6(c) being extruded by the extrusion nozzle illustrated in FIG. 6(a).

FIGS. 6(b) and 6(c) illustrate the extrusion nozzle illustrated in FIG. 6(a) extruding a stacked extruded surfacing layer onto the side of another stacked extruded layer. FIG. 6(d) illustrates one of the extruded surfacing layers illustrated in FIGS. 6(b) and 6(c) being extruded by the extrusion nozzle illustrated in FIG. 6(a).

As illustrated in FIGS. 6(b) and 6(c), the extrusion nozzle 601 may be moved in a substantially horizontal direction across a substantially vertical surface of a second extruded layer 625.

The extrusion nozzle 601 may be positioned so as to cause an upper portion 627 of the outlet 605 to extend above a substantially horizontal upper surface 629 of the second extruded layer 625, thereby allowing excessive extrudate to escape, thus forming an extruded overflow lip 631. Otherwise, variations in the flow of the construction material and/or in the smoothness of the substantially vertical surface 634 on the second extruded layer 625 might cause deviations in the thickness of the surfacing extrusion which is extruded. The top trowel 615 may help smoothen the overflow material. The leading trowel 607 may help ensure that construction material does not escape in front of the extrusion nozzle during its horizontal traverse.

As illustrated in FIGS. 6(b) and 6(c), the extrusion nozzle 601 may be used to face an entire side of an extruded wall, layer by layer. This may be accomplished, for example, by first extruding a first extruded layer 633. This may be done using an extrusion nozzle such as the extrusion nozzle 101 illustrated in FIG. 1(a) or the extrusion nozzle 501 illustrated in FIG. 5(a).

The extrusion nozzle 601 may then be used to extrude a first extruded surfacing layer 635 on the vertical surface of the first extruded layer 633. The second extruded layer 625 may then be extruded on top of the first extruded layer 633, such as by using the extrusion nozzle 101. A second extruded surfacing layer 637 may then be extruded by the extrusion nozzle 601. This process of alternating between the extrusion of a core extruded layer followed by an extruded surfacing layer on that core extruded layer may continue until the extruded wall reaches a desired height. In addition to accommodating for overflow, thereby minimizing non-uniformities in the extruded surfacing layers, the extruded overflow lip 631 may serve to increase the adhesion of each extruded surfacing layer to the face of the corresponding vertical surface on which it has been extruded. The lower trowel 619 may serve to smoothen the seam between each stacked extruded surfacing layer.

Figure 7A:
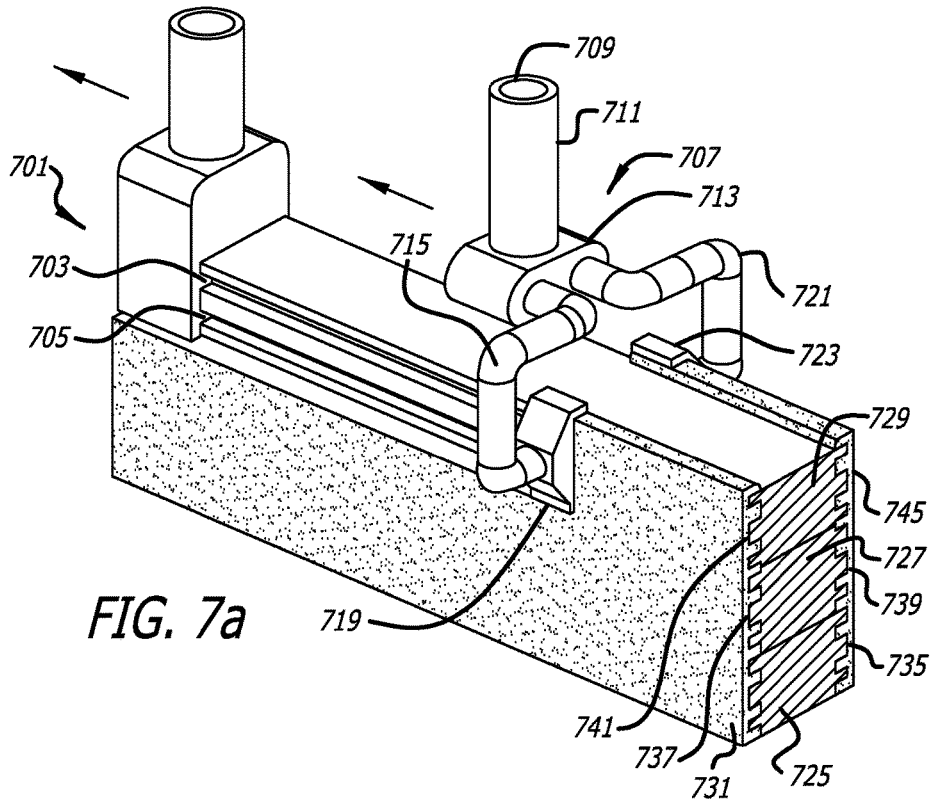
FIG. 7(a) illustrates a stacked internal extruded layer being extruded by an extrusion nozzle and a stacked extruded surfacing layer being extruded on both the inside and outside of the stacked internal extruded layer by a different dual extrusion nozzle assembly.

FIG. 7(a) illustrates a stacked internal extruded layer being extruded by an extrusion nozzle and a stacked extruded surfacing layer being extruded on both the inside and outside of the stacked internal extruded layer by a different dual extrusion nozzle assembly.

As illustrated in FIG. 7(a), an extrusion nozzle 701 may be used to extrude an internal extruded layer. The extrusion nozzle 701 may be of the type illustrated in FIG. 1(a) or may be of any other type. It may include channel protrusions so is to create one or more longitudinal channels in the vertical surfaces of the extruded layer, such as longitudinal channels 703 and 705.

A dual extrusion nozzle assembly 707 may also be provided. This may have a common construction material inlet 709 to a main tube 711 that is connected to a routing chamber 713. The routing chamber 713 may direct the construction material through a first routing tube 715 to first extrusion nozzle 719 and through a second routing tube 721 to a second extrusion nozzle 723. The extrusion nozzles 719 and 723 may be of the type illustrated in FIG. 6(a) or may be of any other type.

The dual extrusion nozzle assembly 707 may be controlled by a positioning system which causes it to move in synchronism with and shortly behind the extrusion nozzle 701. The construction material that is extruded by the extrusion nozzle 701 may or may not have a composition that causes it to solidify very quickly.

As illustrated in FIG. 7(a), several internal extruded layers may be extruded, one on top of the other, such as internal extruded layers 725, 727 and 729, followed by the extrusion of a surfacing layer on both sides of each, such as surfacing layers 731, 735, 737, 739, 741, and 745. As discussed above in connection with FIGS. 6(b) and (c), each surfacing layer may be extruded immediately following the extrusion of the internal extruded layer to which it is applied. The extrusion of the surfacing layers may also result in protruding beads which match with the corresponding longitudinal channels.

The dual exclusion nozzle assembly 707 may be configured so as to cause the extrusion nozzles 719 and 723 to extrude construction material in directions that are substantially opposite of one another. Although the outer walls of the internal extruded layers 725, 727 and 729 are illustrated in FIG. 7(a) as being parallel, they may in other situations not be parallel. In such a situation, the extrusion nozzles 719 and 723 may be oriented so as to extrude opposing surfacing layers that also are not parallel.

Figure 7B:
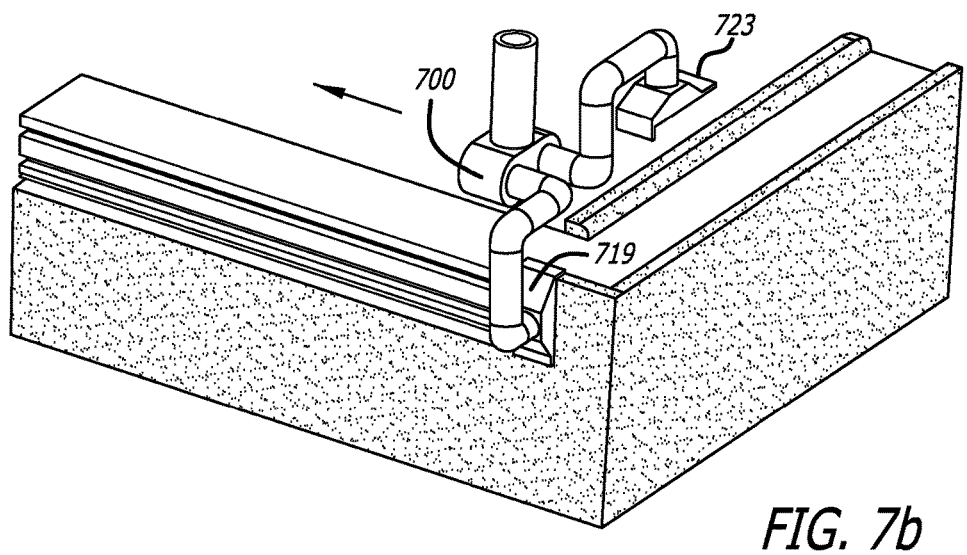
FIGS. 7(b)-7(d) illustrate the stacked extrudate surfacing layer illustrated in FIG. 7(a) being extruded by the dual extrusion nozzle assembly while turning a corner.
Figure 7C:
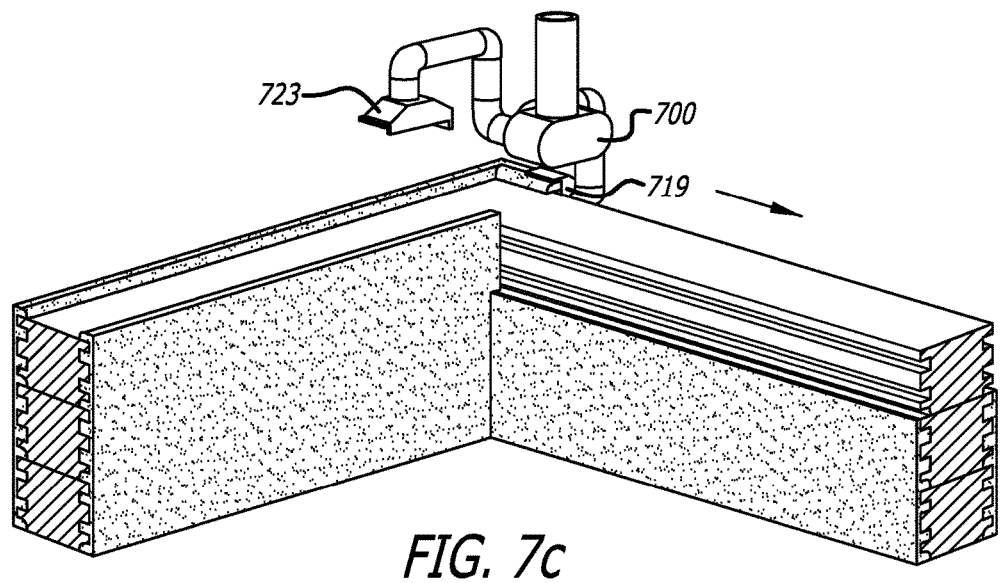
Figure 7D:
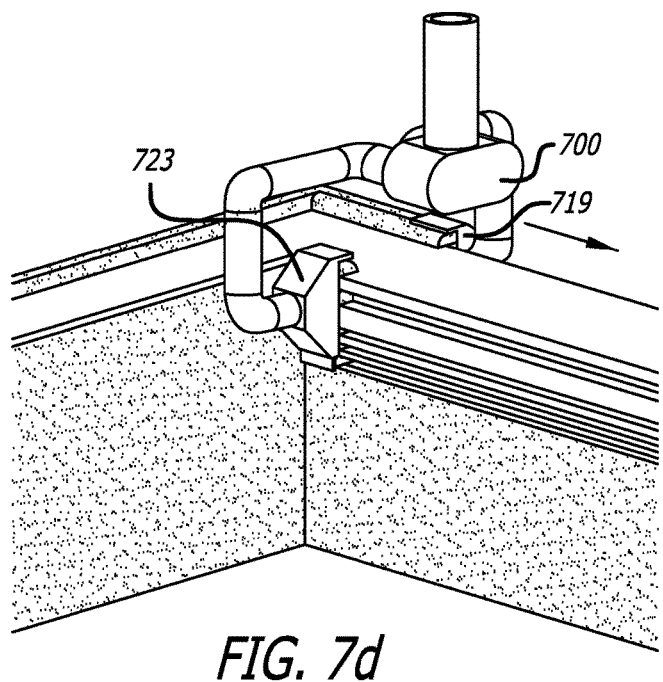

FIGS. 7(b)-7(d) illustrate the stacked extruded surfacing layer illustrated in FIG. 7(a) being extruded by the dual extrusion nozzle assembly while turning a corner. For simplicity, the leading extrusion nozzle 701 has been omitted. As illustrated in FIG. 7(b), the extrusion nozzle 723 has been moved from the extrusion position illustrated in FIG. 7(a) to a non-extrusion position. The non-extrusion position may be such as to prevent the extrusion nozzle 723 from contacting an interior corner of the structure which is being extruded while the extrusion nozzle 719 continues to extrude the construction material against an outer corner of that structure, as illustrated in FIGS. 7(b) and 7(c). The extrusion nozzle 723 may be moved back to the extrusion position so as to continue extruding the extruded surfacing layer on the interior of the structure once it is appropriated to do so, as illustrated in FIG. 7(d).

An actuator mechanism (not visible) may be provided that causes the extrusion nozzle 723 to move from the extrusion position to the non-extrusion position. A separate actuator may similarly be provided that causes the extrusion nozzle 719 to move from the extrusion position illustrated in FIGS. 7(a)-7(d) to a non-extrusion position that prevents contact between the extrusion nozzle 719 and an interior corner of a different structure that may also be extruded.

The actuator mechanisms that are used with the extrusion nozzles 723 and 719 may be of any type. For example, the actuator mechanisms may include one or more server motors, solenoids, numanic actuators, and/or hydraulic actuators. The actuator mechanisms may be located within the routing chamber 713 and/or elsewhere.

FIG. 8 illustrates an internal shut-off valve that may be used in the dual extrusion nozzle assembly illustrated in FIGS. 7(a)-7(d). As illustrated in FIG. 8, the valve 801 may be located within the routing chamber 713. The valve 801 may include a valve door 803 and a corresponding valve closure surface 805 which may be formed by an internal wall of the routing chamber 713. When the extrusion nozzle 723 is in the extrusion position, as illustrated in FIG. 8, construction material may flow from the main tube 711 through the valve door 803 into the extrusion nozzle 723. On the other hand, when the extrusion nozzle 723 is moved to the non-extrusion position, the valve door 803 may be closed by virtue of it coming in contact with the valve closure surface 805, thus preventing construction material from continuing to be delivered to the extrusion nozzle 723. A similar valve may be incorporated into the routing chamber 713 to similarly regulate the flow of the construction material into the extrusion nozzle 719. Shut-off valves of different types and/or in different locations may be used in addition or instead.

A single extrusion nozzle may be used instead of the dual extrusion nozzle assembly illustrated in FIGS. 7(*a*)-(*d*) and in FIG. 8, such as the single extrusion nozzle 601 illustrated in FIG. 6(*a*). In this configuration, the interior and exterior surfacing layers may be extruded sequentially, rather than simultaneously. Alternately, a surfacing layer may only be applied to one side of an extruded surface.

The extruded layers which are surfaced and the extruded layers that surface them may be composed of different types of construction material. For example, the exterior of a building structure may be surfaced with extruded stucco, the internal extruded layer may be concrete, and the internal surfacing layer may be plaster or some form of insulator material such as polyurethane. In another configuration, the external extruded surface may be concrete, the internal extruded layer may be foam (e.g., polystyrene), and the internal surfacing layer may be concrete.

In other configurations, only one of the vertical surfaces of an extruded layer may be surfaced. For example, a cementitious extruded layer may be surfaced with stucco or a foam extruded layer may be surfaced with concrete, or a concreted extruded layer may be surfaced with foam.

In still other configurations, a wall have more than three layers may be extruded.

FIGS. 9(*a*) and (*b*) illustrate an extrusion nozzle configured to extrude an extruded surfaced layer that has a level top surface and a depth that conforms to contours of an uneven ground surface below. Specifically, an extrusion nozzle 901 may include a tube 903 having a construction material inlet 905, a fixed outlet portion 907, a floating outlet portion 913, fixed arms 915 and 917, floating arms 919 and 921, springs 923 and 925, and a wheel 927. The configuration, operation, and alternate embodiments of the extrusion nozzle 901 illustrated in FIG. 9(*a*) and FIG. 9(*b*) may be essentially the same as those illustrated in FIGS. 5(*a*) and 5(*b*) and discussed above, except that the extrusion nozzle 901 may be of the type illustrated in FIG. 6(*a*), while the extrusion nozzle 501 may be of the type illustrated in FIG. 1(*a*).

Figure 10:
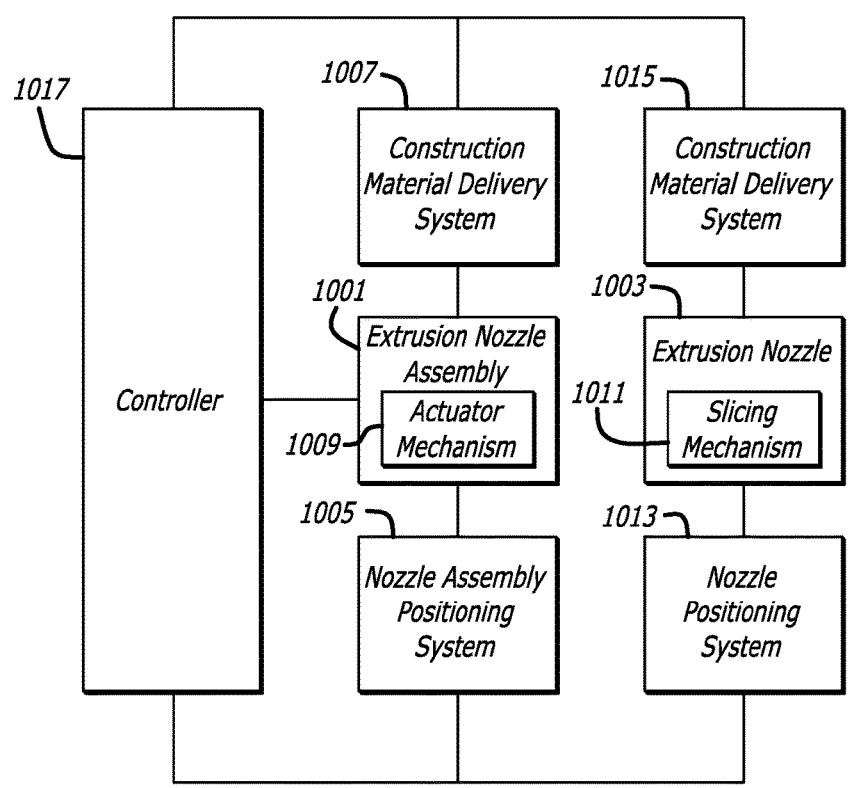
FIG. 10 is a block diagram of a automated extrusion construction system.

FIG. 10 is a block diagram of an automated extrusion construction system. This automated extrusion construction system may be used in connection with any one or more of the extrusion nozzles and associated slicing mechanisms discussed above. Conversely, the extrusion nozzles and associated slicing mechanisms that have been discussed above may be used in connection with any other type of automated extrusion construction system, with any manual type of extrusion construction system, and/or by a construction system that is partially automatic and partially manual.

The automated extruded construction system may include one or more extrusion nozzle assemblies, such as an extrusion nozzle assembly 1001. It may instead have no extrusion nozzle assembly. The automated extrusion construction system may include one or more independent extrusion nozzles, such as an individual extrusion nozzle 1003. It may instead have no independent extrusion nozzles.

The extrusion nozzle assemblies, such as the extrusion nozzle assembly 1001, may include a plurality of extrusion nozzles, such as the dual extrusion nozzle assembly 707 illustrated in FIG. 7(*a*). Each of the nozzles of the extrusion nozzle assembly 1001 may be configured to move from an extrusion position to a non-extrusion position using one or more actuator mechanisms 1009. Again, reference may be made to FIGS. 7(*a*)-7(*d*) for examples.

The extrusion nozzle assembly 1001 may be moved to different positions by a nozzle assembly positioning system 1005. The nozzle assembly positioning system 1005 may be configured to controllably move the extrusion nozzle assembly 1001 to any position within three dimensional space. The nozzle assembly positioning system 1005 may be configured to control the orientation of the outlet or outlets from the extrusion nozzle assembly 1001, as well as their position in space. To accomplish this, the nozzle assembly positioning system 1005 may include one or more robotic systems, such as one or more systems that have been described in one or more of the patent and patent applications identified above. The nozzle assembly positioning system 1005 may utilize one or more sever motors, solenoids, nomadic actuators, hydraulic actuators, gantry positioning systems, and/or any combination of these.

Construction material of any of the types described above may be delivered to the extrusion nozzle assembly 1001 by a construction material delivery system 1007. The construction material delivery system 1007 may include one or more construction material storage tanks, one or more pumps, one or more pressure and/or flow regulators, one or more mixers, or any combination of these.

The extrusion nozzle 1003 may be any of the types of single extrusion nozzles that are illustrated in the drawings and discussed above. The extrusion nozzle 1003 may include a slicing mechanism 1011, such as one of the slicing mechanisms that are discussed above in connection with FIGS. 2(*a*) and 2(*b*) and 4(*a*) and 4(*b*).

The positioning of extrusion nozzle 1003 may be controlled by a nozzle positioning system 1013. The nozzle positioning system 1013 may be any of types of the positioning systems discussed above in connection with the nozzle assembly positioning system 1005.

Construction material may be delivered to the extrusion nozzle 1003 by a construction material delivery system 1015. The construction material delivery system 1015 may be any of the types discussed above in connection with the construction material delivery system 1007.

A controller 1017 may be configured to automate the control of the nozzle assembly positioning system 1005, the nozzle positioning system 1013, the construction material delivery systems 1007 and 1015, and the actuator mechanisms 1009. For example, the controller 1017 may be configured to cause all of these components to function in an orchestrated manner so as to extrude a structure, such as a home or office building, layer by layer, in one or more of the various ways described throughout this application. For example, the controller may be configured to cause the nozzle positioning system 1013 to cause the extrusion nozzle 1003 to traverse a horizontal path, to simultaneously cause the construction material delivery system 1015 to deliver construction material to the extrusion nozzle 1003, thereby causing a first layer to be extruded. The controller 1017 may be configured to cause the nozzle assembly positioning system 1005 to cause the extrusion nozzle assembly 1001 to follow shortly behind the extrusion nozzle 1003 and to extrude surface coatings on the first extruded layer that is extruded by the extrusion nozzle 1003, as illustrated in FIG. 7(*a*). If a corner is turned during this extrusion, the controller 1017 may be configured to cause one of the actuator mechanisms 1009 to move the inside nozzle in the extrusion nozzle assembly 1001 to a non-extrusion position while the corner is being turned, as illustrated in FIGS. 7(*b*)-7(*d*).

After the first layer is extruded, the controller 1017 may be configured to cause a material deposition system (not shown) to deposit an anti-inhesion layer on the surface of the first deposited layer, as illustrated in FIG. 3(*b*). Thereafter, the controller 1017 may be configured to cause the various components which have been described to again extrude a second layer on top of the first layer as illustrated in FIG. 3(*c*) and, optionally, to again surface the vertical sides of the extruded layer, as illustrated in FIGS. 6(*b*) and 6(*c*).

After the second layer is extruded, the controller 1017 may be configured to cause the slicing mechanism 1011 under the control of the nozzle positioning system 1013 to slice through the second extruded layer, as illustrated in FIG. 3(*c*). The controller 1017 may be configured to cause the other components to continue extruding stacked layers, to continue surfacing the inside and/or outside of each of the stacked layers, and to continue making slices for a rectangular opening, as discussed above and illustrated in FIGS. 3(*c*)-(*f*) and FIGS. 6(*b*), 6(*c*), and FIGS. 7(*a*)-7(*d*). The controller 1017 may continue to cause these and similar actions to occur until the entire structure is extruded.

The controller 1017 may be of any type. The controller 1017 may include one or more computer systems, including one or more processing system, movement sensing systems, memories, hard disk, use of interfaces, network systems, and computer programs. The controller 1017 may be programmed to construct an entire building or a substantial portions of it in a completely automated fashion, with minimal or no user intervention.

The components, steps, features, objects, benefits and advantages that have been discussed are merely illustrative. None of them, nor the discussions relating to them, are intended to limit the scope of protection in any way. Numerous other embodiments are also contemplated, including embodiments that have fewer, additional, and/or different components, steps, features, objects, benefits and advantages. The components and steps may also be arranged and ordered differently.

For example, the nozzles that build external and internal extruded surfaces may deposit succeeding surface layers, one surface on the face of the other, in multiple passes. These could be of the same or different material. For example, an insulation material may be extruded onto the internal surface during a first pass and plaster may be extruded over the insulation material during a second pass.

The phrase "means for" when used in a claim embraces the corresponding structures and materials that have been described and their equivalents. Similarly, the phrase "step for" when used in a claim embraces the corresponding acts that have been described and their equivalents. The absence of these phrases means that the claim is not limited to any of the corresponding structures, materials, or acts or to their equivalents.

Nothing that has been stated or illustrated is intended to cause a dedication of any component, step, feature, object, benefit, advantage, or equivalent to the public, regardless of whether it is recited in the claims.

In short, the scope of protection is limited solely by the claims that now follow. That scope is intended to be as broad as is reasonably consistent with the language that is used in the claims and to encompass all structural and functional equivalents.

I claim:

1. A process for constructing a wall having a rectangular opening therein comprising:
    extruding a substantially horizontal layer of construction material;
    covering an upper surface of the extruded layer across a portion thereof which lies at a bottom of a desired rectangular opening with a layer of anti-adhesion material;
    extruding one or more additional substantially horizontal layers of construction material, each on top of a preceding extruded layer, until a top of a last extruded layer substantially coincides with a top of the desired rectangular opening;
    slicing through each of the one or more additional extruded layers at locations which coincide with left and right sides of the desired rectangular opening after each of the one or more additional extruded layers are extruded but before a next layer is extruded;
    covering an upper surface of the last extruded layer across a portion thereof immediately below the top of the desired rectangular opening with a layer of anti-adhesion material;
    extruding another one or more additional substantially horizontal layers of construction material, each on top of the preceding extruded layer; and
    pushing out a block of extruded layers at a location of the desired rectangular opening, thus creating the rectangular opening in the wall.

2. The process of claim 1 wherein the anti-adhesion material is plastic.

3. The process of claim 1 wherein the anti-adhesion material is sprayed on.

4. The process of claim 1 wherein the slicing is performed with a vibrating slicing mechanism.

5. The process of claim 4 wherein the vibrating slicing mechanism is a blade.

6. The process of claim 4 wherein the vibrating slicing mechanism is a cable.

7. The process of claim 1 wherein extruding the one or more additional substantially horizontal layers of construction material, each on top of the preceding extruded layer includes traversing an extrusion nozzle across a horizontal path a plurality of times at different vertical levels.

8. The process of claim 1 further comprising:
    stopping the extrusion of the one or more additional substantially horizontal layers of construction material before slicing through each of the one or more additional extruded layers.

9. A method for constructing a wall having a rectangular opening, comprising:
    extruding a first horizontal layer of construction material;
    covering a portion of an upper surface of the extruded first horizontal layer with a first layer of anti-adhesion material;
    extruding a second horizontal layer of construction material on top of the first horizontal layer of construction material;
    slicing through the extruded second extruded horizontal layer of construction material at locations which coincide with left and right sides of a desired rectangular opening;

covering a portion of an upper surface of the extruded second horizontal layer of construction material with a second layer of anti-adhesion material;

extruding a last horizontal layer of construction material on top of the extruded first horizontal layer of construction material and the extruded second horizontal layer of construction material; and moving a block of extruded layers at a location of the desired rectangular opening to create the rectangular opening in the wall.

10. The method of claim 9 further comprising:

stopping the extrusion of the second horizontal layer of construction material before slicing through the extruded second horizontal layer of construction material.

11. The method of claim 9 wherein the anti-adhesion material is sprayed on.

12. The method of claim 9 wherein slicing through the extruded second horizontal layer of construction material is performed with a vibrating slicing mechanism and includes moving the vibrating slicing mechanism from a non-cutting position to a cutting position where the vibrating slicing mechanism is oriented to slice through the extruded second horizontal layer of construction material.

13. The method of claim 9 wherein moving the block of extruded layers at the location of the desired rectangular opening includes pushing out the block of extruded layers at the location of the desired rectangular opening.

14. The method of claim 9 wherein extruding the second horizontal layer of construction material on top of the first horizontal layer of construction material includes moving an extrusion nozzle in a horizontal direction while extruding the second horizontal layer of construction material from an outlet in the extrusion nozzle to cause an upper surface of the extruded second horizontal layer of construction material to be uniform.

15. The method of claim 9 wherein the portion of the upper surface of the extruded first horizontal layer lies at a bottom of the desired rectangular opening.

16. The method of claim 15 wherein a top of the extruded second horizontal layer of construction material coincides with a top of the desired rectangular opening.

17. A method for constructing a wall having an opening, comprising:

extruding a first horizontal layer of construction material;

covering a portion of an upper surface of the extruded first horizontal layer with a first layer of anti-adhesion material;

extruding a second horizontal layer of construction material on top of the first horizontal layer of construction material;

slicing through the extruded second extruded horizontal layer of construction material at locations which coincide with sides of a desired opening;

covering a portion of an upper surface of the extruded second horizontal layer of construction material with a second layer of anti-adhesion material;

extruding a last horizontal layer of construction material on top of the extruded first horizontal layer of construction material and the extruded second horizontal layer of construction material; and moving a block of extruded layers at a location of the desired opening to create the opening in the wall.

18. The method of claim 17 wherein the portion of the upper surface of the extruded first horizontal layer lies at a bottom of the desired opening.

19. The method of claim 17 wherein a top of the extruded second horizontal layer of construction material coincides with a top of the desired opening.

20. The method of claim 17 further comprising:

extruding a third horizontal layer of construction material on top of the extruded first horizontal layer of construction material; and slicing through the extruded third horizontal layer of construction material at locations which coincide with sides of the desired opening.

* * * * *